UNITED STATES PATENT OFFICE.

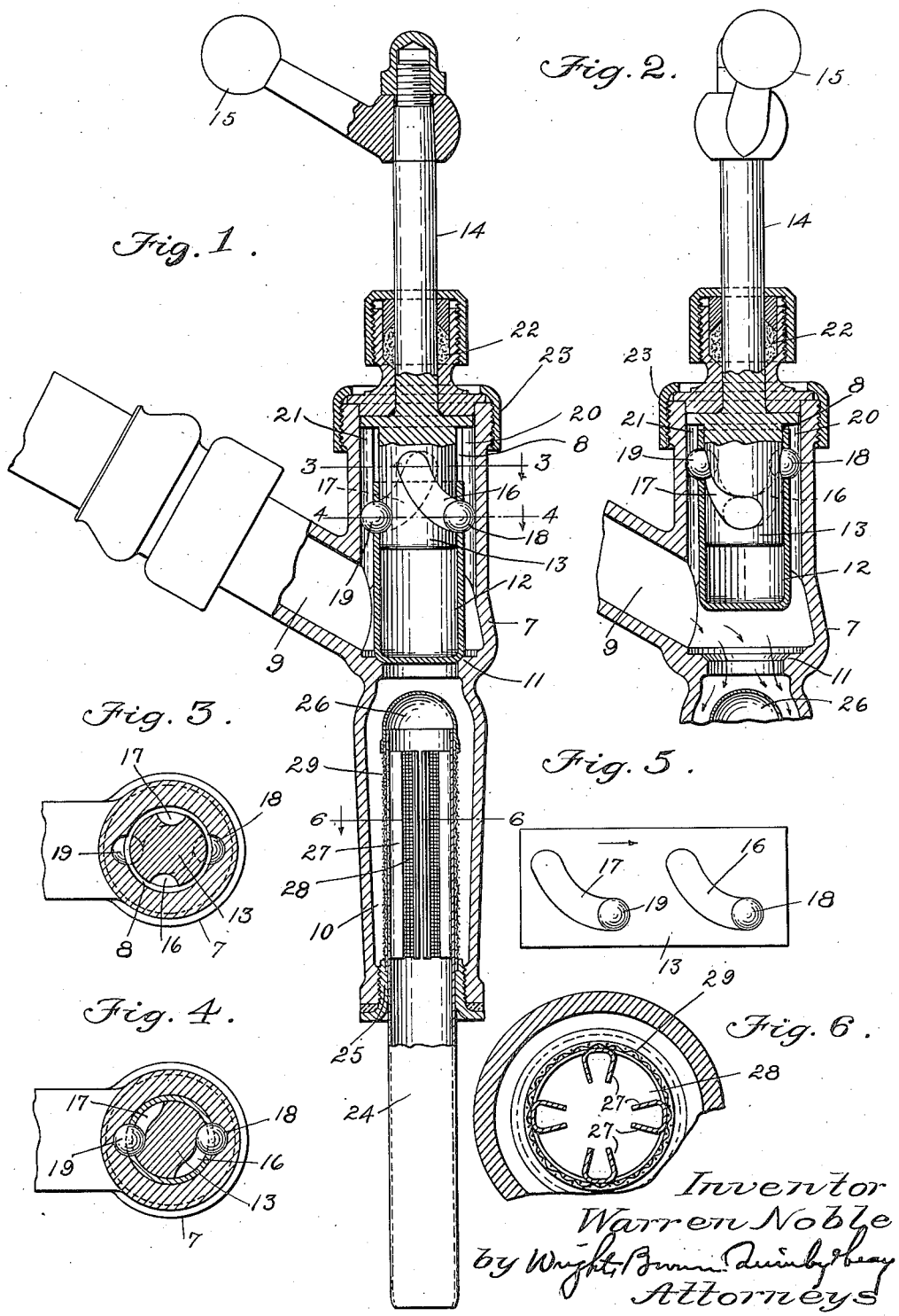

WARREN NOBLE, OF PROVIDENCE, RHODE ISLAND, ASSIGNOR TO TUBULAR WOVEN FABRIC COMPANY, OF PAWTUCKET, RHODE ISLAND, A CORPORATION OF RHODE ISLAND.

VALVE AND NOZZLE.

1,403,056.  Specification of Letters Patent.  Patented Jan. 10, 1922.

Application filed April 18, 1919. Serial No. 291,018.

*To all whom it may concern:*

Be it known that I, WARREN NOBLE, a subject of the King of Great Britain, residing at Providence, in the county of Providence and State of Rhode Island, have invented new and useful Improvements in Valves and Nozzles, of which the following is a specification.

The present invention has two principal objects, first, to provide a quick closing valve having improved operating means by which both a wide opening of the valve and a firm seating under heavy pressure, may be secured by a relatively small movement of the operating member; and second, to provide a new and improved construction of strainer in the nozzle or other fitting with which such valve is combined. I have embodied the invention accomplishing both the aforesaid objects in a single structure adapted to serve as the nozzle of a liquid delivering pipe, such for example as a hose adapted and connected for supplying gasoline to motor cars, and I will in the following specification describe this particular embodiment in order to explain the fundamental characteristics of the invention. It is to be understood, however, that the specific embodiment thus shown and described is not intended as a limitation in the construction and use of the invention, for the same strainer invention may be applied in any combination and for any use where it is desired to filter foreign matter from liquid flowing through a conduit; and the valve means may be applied in any connection where a valve is useful.

The invention consists in the novel constructions and combinations which I will describe in the following specification, and in the principles contained therein, and all modifications and other embodiments of such principles embraced within the scope of the appended claims. Referring now to the drawings, Figure 1 is a longitudinal sectional view of the delivery nozzle for a gasoline hose embodying the principles of the invention, the valve therein being shown closed. Figure 2 is a similar view of that part of the nozzle which includes the valve, but representing the valve in its open position. Figures 3 and 4 are cross sections on lines 3—3 and 4—4, respectively, of Figure 1. Figure 5 is a view representing the development of the cam elements in the valve operating spindle. Figure 6 is a cross section on line 6—6 of Figure 1, showing that part of the nozzle in which the strainer is located.

Like reference characters designate the same parts in all the figures.

7 designates the body or shell of the structure which is provided with a valve chamber 8, a branch 9 through which the liquid enters, and an outlet branch 10. At the junction between the branches 9 and 10 is a valve seat 11 with which coacts a valve 12, the latter being cup shaped, or in other words of tubular form with an end wall, and arranged with the corner between its end wall and its side walls adapted to make contact with the seat 11. Ordinarily the valve seat will be made circular and the valve cylindrical but the invention is not necessarily limited to that form. Likewise without intending to imply any limitation thereby, I will state that the valve is preferably made of sheet metal by well understood drawing processes from a flat blank.

Numerous variations in the form, construction, and material of the valve may be made provided only it is constructed to make a tight joint with the valve seat, and that it has both an interior opening adapted to contain a spindle or equivalent operating means and a cross web or wall preventing flow through its interior.

This valve is fitted to slide freely endwise in the valve chamber branch 8 of the casing, and it receives in its interior a freely rotatable spindle 13 from which projects a stem 14 carrying a handle 15. The spindle is formed with cam grooves 16, 17 in which balls 18, 19 are partly contained, which balls are confined in holes in the side walls of the valve and project into longitudinal guide grooves 20, 21 of the valve casing. The combined depth of the cooperating guide and grooves, plus the space between the casing wall and the spindle, which admits the sides of the cup valve, is approximately equal to the diameter of the balls and these grooves are preferably shaped conformably to the spherical curvature of the balls and are of approximately equal depth whereby the balls occupy a central position with respect to the valve; in other words the valve wall surrounds an equatorial zone of each ball.

As the cam grooves 16 and 17 are inclined to the axis of the spindle, that is, have a general helical curvature, rotation of the spindle acts to displace the balls along the guides 20 and 21, and thereby to displace the valve correspondingly, as shown by a comparison of Figures 1 and 2, either closing or opening the valve according to the direction of rotation of the spindle. The cam grooves also have different pitches at their opposite ends, the end nearer to the valve seat having a low helix angle, or slow pitch, and the balance of the groove up to the end more remote from the valve seat having a steep pitch or relatively very fast lead. Thus when the valve is wholly or nearly closed the balls occupy parts of the cam groove which have the small angle, whereby a very powerful closing pressure may be exerted; while the steep pitch of the balance of the cam grooves enables the valve to be widely opened with a small angle of rotation of the operating stem. Thus I secure the two desirable effects of quick opening and closing of the valve and a powerful closing pressure, enabling the valve to be firmly seated and tightly closed.

For the purposes of this specification I will designate the balls by the term "cam rider", and within this term I include all equivalents for the balls 19 which are capable of traveling in or on guides and of being propelled by cam elements. I prefer to use balls as such cam riders rather than sliding riders on account of the lower frictional resistance of such balls, but I claim protection for the essential combination including any sort of riders whether capable of rolling or having a sliding motion.

I have shown two cam grooves, two guide grooves, and two cam riders in this design but I may use more than two. Whatever the number of these members may be they are preferably spaced equally around the axis of the structure. In the design shown each cam groove is included within less than half of the circumference of the spindle, and in fact within such a small circumferential angle that approximately a quarter turn of the handle is sufficient to move the valve from fully opened to fully closed position, and vice versa. I may, however, make the cam grooves with a lower lead angle or provide such a number of cam grooves that their circumferential extent is greater than their angular spacing around the axis, and in doing so I may, if necessary, distribute the cam riders lengthwise of the valve in different transverse planes in order to avoid interference of the cam grooves with one another.

The valve and spindle are retained in the casing by any ordinary or other suitable stuffing box 22 and retaining collar 23.

The above described type of valve and operating mechanism has various advantages among which may be named the following; that the construction is very compact and consists of few and simple parts, inexpensive to make and easily assembled, that the provision of cam riders separate from the valve, and particular the ball type of rider gives low cost and efficient operation by reducing friction, and that the tubular or cup type of valve permits simpler flow lines of the fluid passing the valve than is the case with valves which have heads, such as the mushroom or poppet type valves.

In the outlet branch 10 of the valve casing there is detachably mounted a discharge tube 24 by means of a threaded nipple 25 secured to the discharge tube and engaging threads in the end of the branch 10. The tube 24 extends well into the casing and on its upper end has a hemispherical cap 26. Between this cap and the nipple or ferrule 25 the walls of the tube are slit lengthwise to form four pairs of flaps 27 which are bent inward and thereby provide intermediate openings 28. These openings are the passages through which the gasoline or other liquid flows on its way to the discharge orifice of the nozzle, and they are surrounded by a fine gauze screen 29 which is wrapped about that part of the tube and the ends of which are confined by the ferrule 26 and the cap 25. The screen may be permanently secured by solder, or it may be fastened mechanically in a detachable manner. It provides a filter on the outside of the tube through which the gasoline must flow before being finally delivered, and on the exterior of which all foreign matter carried by the gasoline is deposited. This tube with the filter upon it is readily detachable for cleaning, and as all the deposited matter is lodged on the outside of the filter screen, cleaning is made easy.

The valve means and filter are both parts of the same structure, namely, a gasoline delivery valve, co-operating in the delivery of purified gasoline, wherefore I claim them in combination with this application; but each is adapted to be used in other connections and combinations, and this is particularly true of the valve and the operating mechanism therefor, wherefore I do not limit my protection for these means to the particular combination and construction shown. Among the modifications in my contemplation are all reversals of the elements hereinbefore described. It may be considered in respect to the valve, that the casing is an outer member and the stem is an inner member, either one of which may be rotatable and the other mounted stationary, and either of which also, whether rotatable or stationary, may contain the cam grooves, and the other may contain the guide grooves or guideways. Also within my contemplation is it to form the guide elements and cam elements otherwise than as grooves, and to modify the cam riders in correspondence.

What I claim and desire to secure by Letters Patent is:

1. A valve device comprising a casing, a valve, an operating member and a cam rider separate from the valve, the valve being interposed between said casing and operating member and having an opening in which the cam rider is confined, one of the members constituted by the casing and operating member being movable relatively to the other, and one of them having a cam portion, the other having a guide portion, with which cam and guide portions said rider is engaged, whereby movement of one of said members relatively to the other is effective to displace the valve.

2. A valve device comprising a casing having a seat, a valve therein cooperating with said seat and having a tubular part, a relatively rotatable operating stem entering said tubular part, and a cam rider, one of the members constituted by said casing and operating stem having a cam portion and the other having a guide portion, and the cam rider being seated in an opening in said tubular part of the valve and engaged with both said cam portion and said guide portion.

3. A valve device comprising a casing having a seat, a valve therein cooperating with said seat and having a tubular part, a relatively rotatable operating stem entering said tubular part, and a cam rider, one of the members constituted by the casing and stem having a substantially helical cam groove and the other having an axially extending guideway, and the cam rider being confined in a hole in the valve and projecting into both the cam groove and the guideway.

4. A valve device comprising a casing having a seat, a valve therein cooperating with said seat and having a tubular part, a relatively rotatable operating stem entering said tubular part, and a cam rider, one of the members constituted by said casing and operating stem having a cam portion and the other having a guide portion, and the cam rider being seated in a part of the valve and engaged with both said cam portion and said guide portion; said cam portion making a small angle with the plane perpendicular to its rotational axis in that part which engages the rider when the valve is closed, and making a relatively steep angle with the same plane in that part which acts upon the rider in opening the valve.

5. A valve device comprising a casing having a seat, a valve therein cooperating with said seat and having a tubular part, a relatively rotatable operating stem entering said tubular part, and a cam rider, one of the members constituted by the casing and stem having a substantially helical cam groove and the other having an axially extending guideway, and the cam rider being confined in a hole in the valve and projecting into both the cam groove and the guideway, said cam having a low helix angle in that part which acts on the rider when the valve is closed, and having a steeper pitch in other parts.

6. A valve mechanism comprising in combination with a seat, a valve having a tubular portion, inner and outer concentric cooperating members one of which is stationary and the other is rotatable, arranged with an annular space between them in which the tubular part of the valve is interposed, one of them having also a cam and the other a guide element, and a cam rider seated in the interposed part of the valve and otherwise independent thereof and engaged with both the cam and the guide element whereby to cause displacement of the valve when one of said members is rotated relatively to the other.

7. A valve comprising a casing having an annular seat, a sheet metal cup arranged to move endwise in said casing having its bottom adjacent to said seat and of a diameter adapting it to coact therewith as a valve, said casing having inlet and outlet passages at opposite sides of the seat, a rotatable operating member in substantially coaxial relation with said valve cup, and means for causing endwise movement of the valve cup when said operating member is rotated.

In testimony whereof I have affixed my signature.

WARREN NOBLE.